United States Patent [19]
Tore

[11] Patent Number: 6,142,762
[45] Date of Patent: Nov. 7, 2000

[54] DIE PIN STROKE POSITIONER

[75] Inventor: Lynn M. Tore, Milford, Ohio

[73] Assignee: Milacron Inc., Cincinnati, Ohio

[21] Appl. No.: 09/203,865

[22] Filed: Dec. 2, 1998

[51] Int. Cl.[7] .................................................. B29C 47/22
[52] U.S. Cl. ..................... 425/192 R; 425/381; 425/466; 425/532
[58] Field of Search .................................. 425/532, 381, 425/466, 192 R

[56] References Cited

U.S. PATENT DOCUMENTS

| | | | |
|---|---|---|---|
| 3,205,534 | 9/1965 | Langecker | 425/466 |
| 3,267,519 | 8/1966 | Albert | 425/466 |
| 3,345,690 | 10/1967 | Hagen | 425/532 |
| 3,369,272 | 2/1968 | Martin, Jr. et al. | 425/532 |
| 3,555,602 | 1/1971 | Bourgeois | 425/381 |
| 3,676,039 | 7/1972 | Hulstein | 425/466 |
| 4,038,017 | 7/1977 | Langecker | 425/466 |
| 4,097,214 | 6/1978 | Hsu | 425/466 |
| 4,171,195 | 10/1979 | Klein et al. | 425/141 |
| 4,218,416 | 8/1980 | Gokcen | 425/381 |
| 4,394,116 | 7/1983 | Kuenzig et al. | 425/192 R |
| 5,338,173 | 8/1994 | Kato et al. | 425/150 |

*Primary Examiner*—Robert Davis
*Attorney, Agent, or Firm*—Stephen H. Friskney

[57] ABSTRACT

The accumulator of an extrusion blow molding machine is constructed to include a stroke positioner that comprises inter-engaging, threaded components that enable the piston of the programming cylinder to be adjusted relative to the inner rod of the programming system in the accumulator assembly. Since the inner rod ultimately connects to the die pin, this adjustment directly determines the position at which the piston in the programming cylinder will close off the die gap. In particular, the components of the programming system can be adjusted so that the die gap is closed just as the piston of the programming cylinder reaches the limit of its stroke.

2 Claims, 3 Drawing Sheets

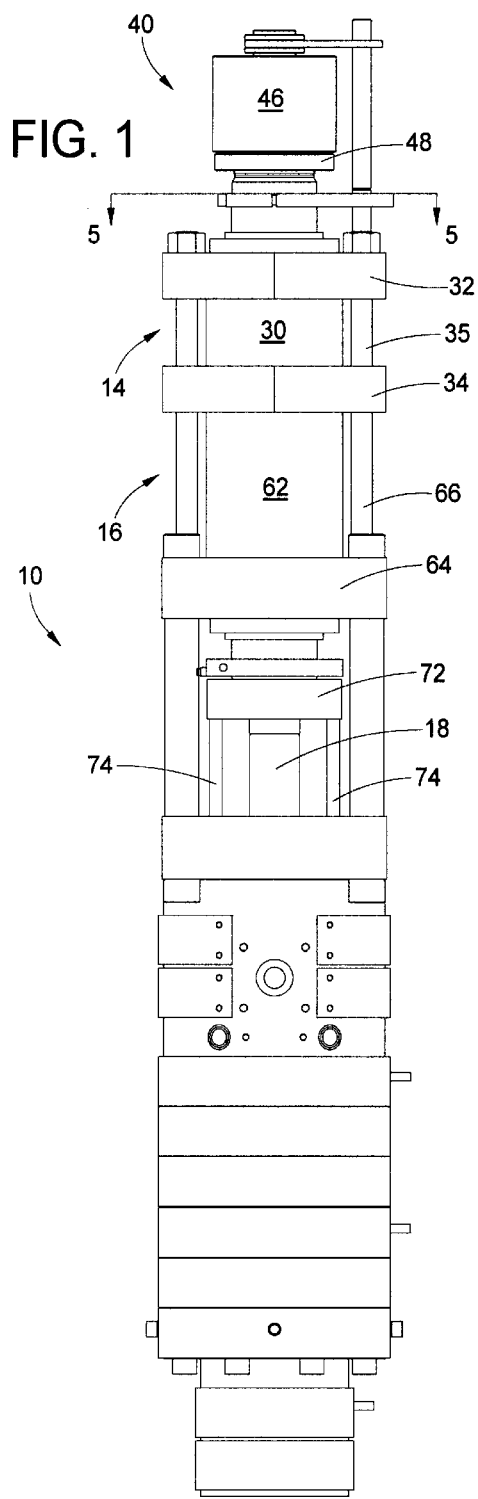
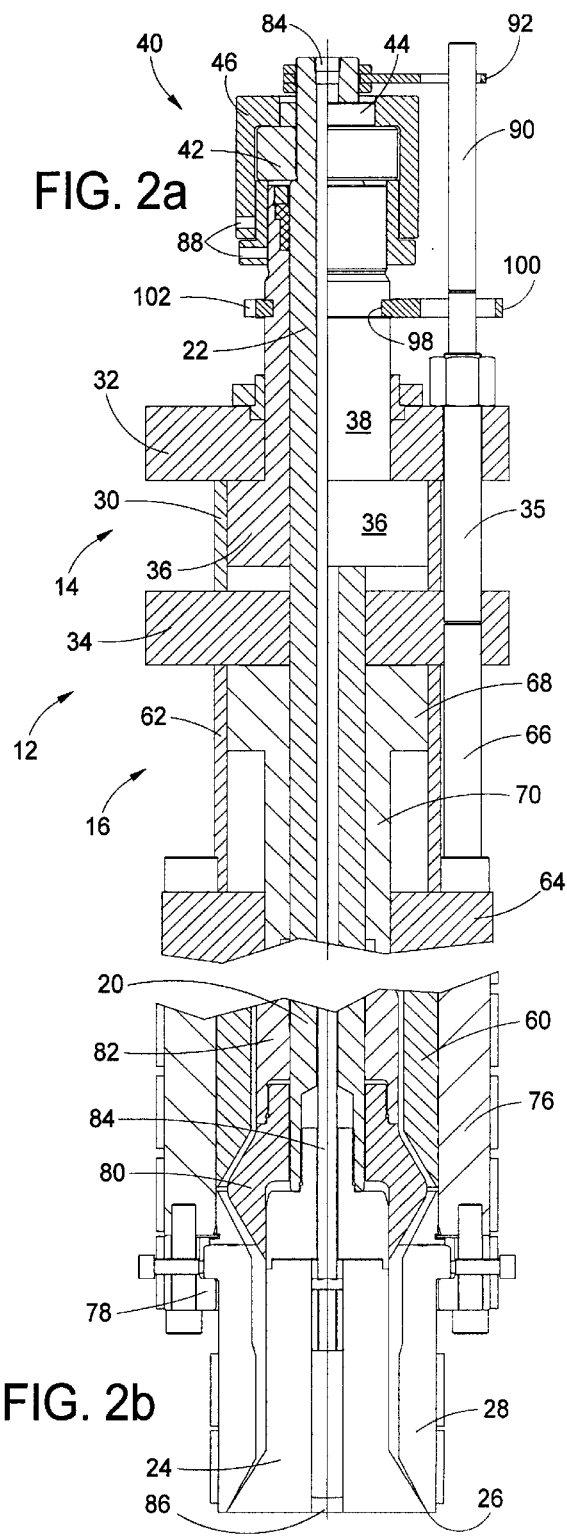

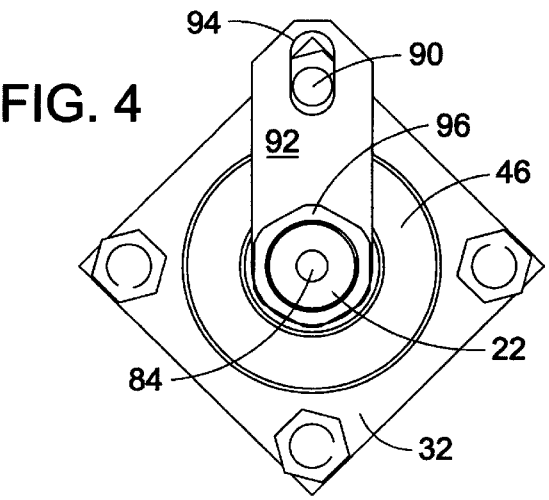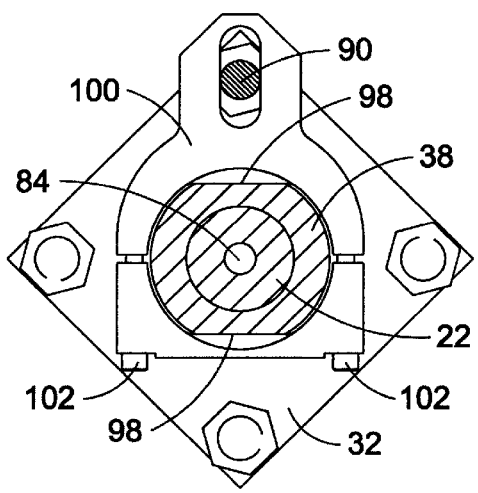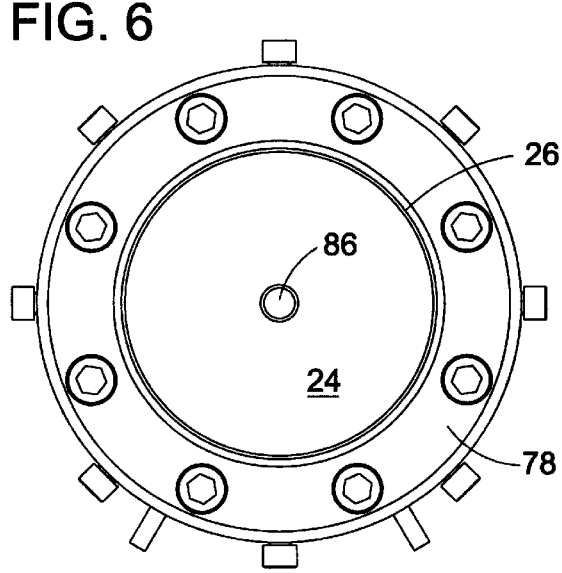

DIE PIN STROKE POSITIONER

BACKGROUND OF THE INVENTION

1. Field of the Invention

The present invention relates generally to extrusion blow molding machines and, more particularly, to apparatus for variably positioning the die pin with respect to the associated actuator in the accumulator head of an extrusion blow molding machine.

2. Description of the Related Art

Containers and other hollow articles are frequently formed by blow molding. The blow molding process involves providing a tube of heated and softened plastics material (parison) about which a two-piece mold is closed. Air or another gas is introduced under pressure into the parison to expand the parison against the walls of the mold, forming the desired hollow article. Such blow molding machines can be of various types; the most common of which are extrusion blow molding machines and injection-blow molding machines.

In extrusion-blow molding machines, thermoplastic material is heated and softened in an extruder and is conveyed into a die head from which a tubular parison is extruded. The parison can either be continuous, whereby a plurality of molds are sequentially enclosed about successive, axially spaced portions of the parison, or individual parisons can be intermittently extruded and subsequently blown. In the latter instance, the die head is associated with a chamber, usually called an accumulator, in which the extruded material is accumulated to provide a predetermined volume of material. The accumulated volume of material is then ejected through an annular die at the outlet of the accumulator to form a parison having the desired length, diameter, and wall thickness distribution.

Typically, an accumulator has a purging system to accomplish the function of ejecting the accumulated material by forcing it through the die at the outlet. A programming system is provided to control the die opening at the outlet for varying the wall thickness of the extruded parison and to close the die while plastic for the next parison is being fed into the accumulator. It is desirable for the programming system to return rapidly to the close-off position after the parison is formed, so that the flow of melt to the accumulator chamber can be resumed, thereby avoiding a pressure build-up in the extruder. Obviously, movement to die close-off needs to be relatively precise to protect the expensive die tooling; in other words, close the die opening quickly, but in a way that avoids impact between the die pin and outer ring.

Prior art constructions have attempted to provide a rapid return to the die close-off position by various methods. One method involves connecting the piston of the programming cylinder directly to a two-piece rod that attaches to the die tooling, and thereby control the die opening. Spacers are fitted between adjoining ends of the two-piece rod to define a specific rod length that is matched to a particular set of tooling. Since the rod connects directly to the die pin, the length of the rod determines the position at which the piston in the programming cylinder will close off the die gap. The rod is given a length that results in the die gap closing just as the piston reaches the limit of its stroke. Although reasonably effective, this approach requires the time consuming adjustment of spacers in the rod to construct the desired length—which must be performed each time the die tooling is changed.

Another method of the prior art relies on a mechanical stop to enable rapid return to the die close-off position after the parison is formed. This construction also requires that the piston of the programming cylinder connects directly to the die support rod, but further includes a separate element, sometimes referred to as a "stroke limiter." The stroke limiter typically threads onto the upper end of the die rod which allows it to be adjusted to a position where it contacts a stationary (rigid) surface when the die pin is in the close-off position. While this system is also generally effective, the rapid movement of the piston to close off the die gap causes the stroke limiter to "hammer" against the stop surface during every cycle. The continuing impact between these elements results in abnormal wear of the components and necessitates continued adjustment to maintain the desired close-off position.

SUMMARY OF THE INVENTION

It is an object of the present invention to provide an apparatus that overcomes the disadvantages of the prior art by enabling quick, low maintenance adjustment of the stroke of the programming actuator to achieve die close-off quickly and in a way that avoids impact between the die pin and outer ring.

In the preferred embodiment, the present invention accomplishes the stated objective through the use of inter-engaging, threaded components that enable the piston of the programming cylinder to be adjusted relative to the inner rod of the programming system in the accumulator assembly. Since the inner rod ultimately connects to the die pin, this adjustment directly determines the position at which the piston in the programming cylinder will close off the die gap. In particular, the invention allows the programming system to be adjusted so that the die gap is closed just as the piston of the programming cylinder reaches the limit of its stroke—all the way "up" for diverging tooling or all the way "down" for converging tooling. Accordingly, the present invention involves a unique construction that enables the user to adjust readily (not just limit) the stroke of the programming cylinder relative to the die pin.

In summary, this new configuration avoids the time consuming adjustment of spacers in the rod for some accumulator assemblies and eliminates the wear, maintenance and reliability problems associated with a stroke limiter (mechanical stop) used for other constructions used in the prior art.

BRIEF DESCRIPTION OF THE DRAWINGS

FIG. 1 is a side elevational view of an accumulator head with a stroke positioner in accordance with the present invention.

FIGS. 2a and 2b are enlarged fragmentary, side elevational views, partially in section, showing in greater detail the upper and lower portions of the accumulator head of FIG. 1, including the elements of the stroke positioner and related components of the programming system and die head in accordance with the present invention.

FIG. 4 is an enlarged, upper end view, showing additional detail of components associated with of an accumulator head having a stroke positioner in accordance with the present invention.

FIG. 5 is an enlarged, sectional view taken along the line 5—5 of FIG. 1, showing additional detail of components associated with of an accumulator head having a stroke positioner in accordance with the present invention.

FIG. 6 is an enlarged, lower end view looking up at the die head of an accumulator head with a stroke positioner in accordance with the present invention.

DESCRIPTION OF THE PREFERRED EMBODIMENT

Figure 3:
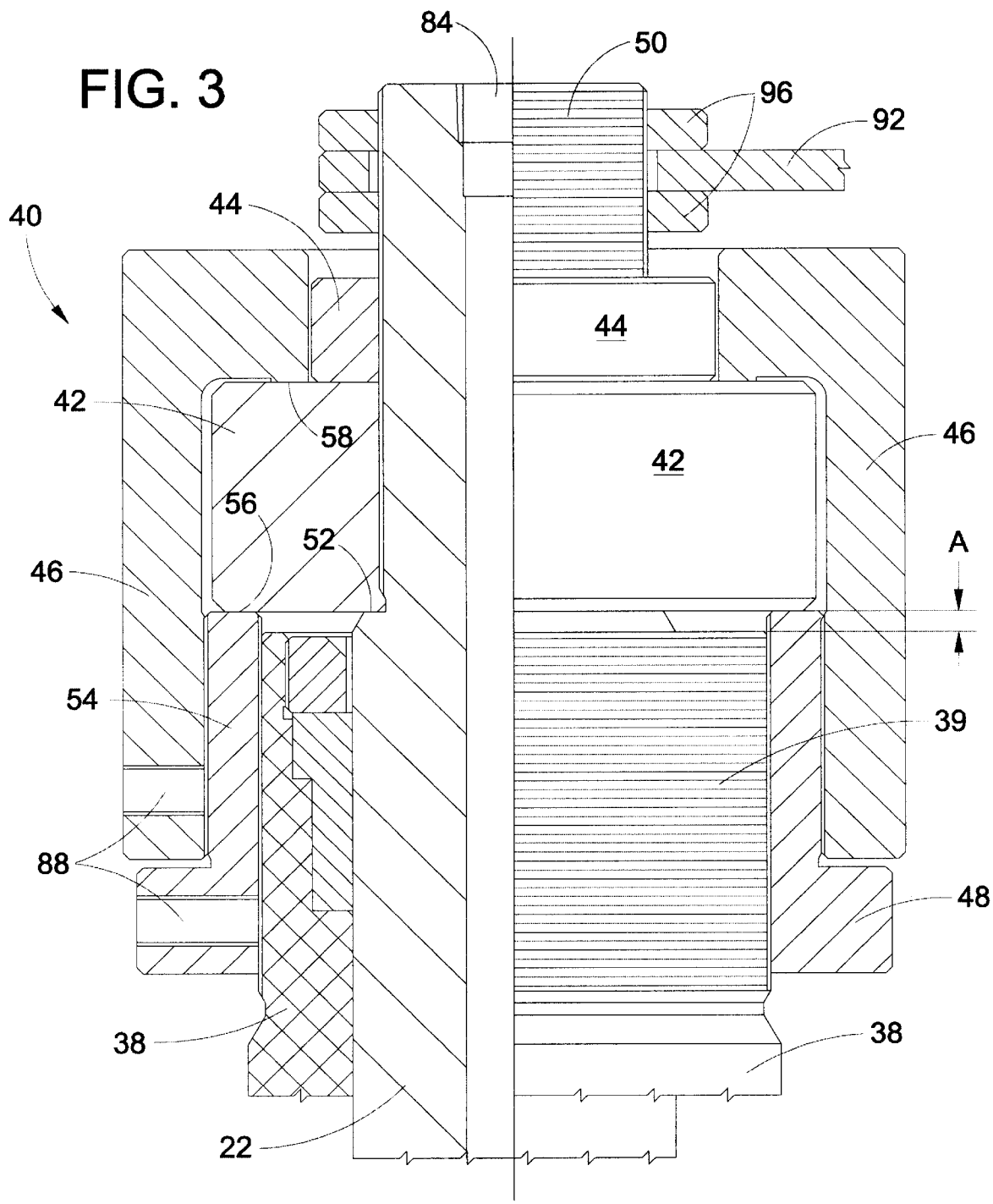
FIG. 3 is a further enlargement of the drawing of FIG. 2a showing the upper portion of the accumulator, in particular, the elements of the stroke positioner in accordance with the present invention.

The present invention involves apparatus associated with extrusion blow molding machines. In order to understand the invention better, it is useful to describe it in the context of a typical blow molding machine that includes an accumulator head 10. Extrusion blow molding machines include an extruder (not shown) having a tubular barrel that contains a rotatable plasticizing screw. The plasticizing screw works in conjunction with heating of the barrel to convey and soften solid, thermoplastic material, thereby providing a viscous, flowable melt for subsequent use in forming a parison, as is generally known in the art.

Referring now to the drawings, and particularly to FIGS. 1 and 2, the outlet of the horizontally disposed extruder barrel is connected to a substantially vertically disposed accumulator head 10, in order to provide a flow path for transfer the plasticized material from extruder. Positioned below the accumulator head 10 is a mold (not shown) configured in a manner known to those skilled in the art, typically in the form of two horizontally opposed mold portions. Each of the mold portions is machined to define a mold cavity that conforms in shape with the desired external surface conformation of the finished blow molded article when the two mold portions are brought together.

The accumulator head 10 provides a means of quickly forming a parison that requires a relatively large quantity of plastic melt; its construction is shown in greater detail in FIGS. 2 through 6. The upper portion 12 of the accumulator 10 includes two hydraulic cylinders that have axially aligned mechanisms to provide a programming actuator 14, and a purging actuator 16. As shown in FIGS. 2a and 2b, the accumulator 10 includes a parison rod 18 that extends virtually the entire length (height) of the accumulator. Preferably, for ease of fabrication, the parison rod 18 is formed from two rods sections rigidly connected together. The lower rod section 20 connects to the die pin at one end and rigidly connects at the other end to the upper rod section, identified herein as the inner cylinder rod 22 of the stroke positioner, as will be more fully described below.

The programming actuator 14 of the programming system is used to move the die pin 24 up or down, thereby varying the size of the annular opening at parison die outlet 26. The actuator 14 also operates to close the outlet 26 while a shot of material is building in the accumulator chamber, as will also be more fully described below. In the embodiment shown, the die ring 28 and die pin 24 illustrate diverging tooling; i.e., downward movement of the die pin 24 enlarges the die opening to increase parison wall thickness and upward movement constricts the opening to decrease wall thickness, eventually closing the outlet so that the accumulator can be recharged. This type of tooling is typical for forming larger diameter parisons. Converging tooling (not shown), as is often used with small parisons, would close by downward movement and open when the die pin moves upward.

Referring in particular to FIG. 2a, the programming actuator 14 comprises a cylinder 30 having ends defined by a top plate 32 and a center plate 34 connected by tie rods 35, and a piston 36 linearly movable within the cylinder 30. The piston 36 has an elongated, cylindrical body portion 38 that extends through the top plate 32. For descriptive purposes, the cylindrical body portion 38 of the piston 36 will be generally referred to as the outer cylinder rod 38. The end of the outer cylinder rod 38 opposite the head of the piston 36 includes a threaded section 39. While the outer cylinder rod 38 is shown as being integral with the head of piston 36, for manufacturing purposes, the piston 36 could comprise two separate elements rigidly connected at assembly. It should also be noted that the inner cylinder rod 22 passes through a central axial bore in the piston 36; connection of the inner cylinder rod 22 to the outer cylinder rod 38 of the piston 36 is accomplished by the elements of the stroke positioner 40.

More specifically, as best seen in FIG. 3, the elements of the stroke positioner 40 include a piston nut 42, a lock nut 44, a pull-down nut 46, and a push-up nut 48. For assembly of the stroke positioner 40, the push-up nut 48 is threaded onto the end 39 of the outer cylinder rod 38. With the push-up nut 48 having the configuration shown, including a threaded section 54 on a portion of its outer diameter, the pushup nut 48 effectively provides a means of adjusting the overall length of the outer rod 38. Since it is part of the piston 36, the outer rod 38 does not change with adjustment of the stroke positioner 40. However, adjusting the position of the push-up nut effectively changes the length of outer rod 38 by an amount equal to the gap "A" between the threaded end 39 and the lower surface of the piston nut 42.

The inner rod 22 is inserted into the axial bore of the piston 36, so that a threaded end 50 of the inner cylinder rod 22 extends beyond the threaded section 39 of the outer cylinder rod 38 and push-up nut 48. The piston nut 42 is threaded onto the end 50 of the inner rod 22 until it abuts a shoulder 52 on the inner rod 22 adjacent the threaded portion 50. Note that the outer diameter of the piston nut 42 is sufficiently large so that it has an annular surface area in contact with the upper end surface 56 of the push-up nut 48 threaded on the end section 39 of the outer rod 38. To make sure the piston nut 42 stays in this position on the inner rod 22, a lock nut 44 is likewise threaded on the end 50 until it tightly abuts the piston nut 42. To further secure the construction, set screws can be provided in the lock nut 44 and piston nut 42. To complete assembly of the stroke positioner 40, the pull-down nut 46 is threaded onto the threaded section 54 of the outer diameter of push-up nut 48 and tightened so that the piston nut 42 is trapped between the upper surface 56 of the push-up nut 48 and an inner bearing surface 58 of the pull-down nut 46.

The stroke positioner 40 provides a means of adjusting the position of the piston 36 relative to the die pin 24 by their common connection to the inner cylinder rod 22. Specifically, adjustment of the push-up nut 48 varies the overall length of the outer rod 38 thereby changing the length of the inner rod 22 that extends between the piston 36 and the die pin 24. During machine "set-up", the stroke positioner 40 is adjusted so that the die pin 24 moves into contact with the die ring 28 to close off the die outlet 26 simultaneously with the piston 36 of the programming actuator 14 reaching the end of its stroke. The initial adjustment of the stroke positioner 40 will compensate for manufacturing tolerances in the individual components of the accumulator head 10, as well as die tooling. Subsequent adjustments of the stroke positioner 40 would be made when the die tooling is changed, then compensating only for the variation between tooling.

The method of adjustment simply involves: (a) loosening the pull-down nut; (b) operating the piston 36 to move to the desired end of stroke; (c) rotating the pushup nut 48 so that it moves up or down in a manner that cooperates with the piston nut 42 to move the inner rod 22 (as required) and close the die outlet 26; and (d) re-tightening the pull-down nut 46 against the piston nut 42. This establishes a fixed distance between the piston 36 and the die pin 24 so that the die outlet will close simultaneously with the piston 36 reaching the end of its stroke. To facilitate the adjustment process, the push-up nut 48 and pull-down nut 46 can be provided with spanner wrench holes 88, as desired.

As shown in the drawings, particularly FIGS. 4 and 5, the construction of the accumulator 10 preferably includes elements to prevent rotation of the inner cylinder rod 22 and outer cylinder rod 38 during adjustment of the stroke positioner 40. By maintaining the relative orientation of the associated components, this construction also prevents damage of sensitive measuring devices. In particular, a stationary post 90 extends vertically from the top plate 32. An inner anti-rotation arm 92 is securely attached to the inner cylinder rod 22 by means of lock nuts 96 on both sides (see FIG. 3). The inner arm 92 is restrained from rotational movement in either direction by the post 90 that is received in an appropriately sized aperture 94 in the arm 92.

Similarly, an outer anti-rotation arm 100 is received by diametrically opposed, flat notches 98 formed in the outer cylinder rod 38. For ease of assembly, the arm 100 is preferably formed from two pieces with flat surfaces to match the notches 98, and securely attached to the outer rod 38 by bolts 102. The outer arm 100 is likewise restrained from rotational movement in either direction by the post 90 that is received in an appropriately sized aperture 104 in the arm 100.

The purging actuator 16 (FIG. 1) is positioned below the programming actuator 14 and operates in a vertical (downward) direction to move the ram 60 and cause material contained in an annular, internal chamber of accumulator head 10 to be ejected in the form of a parison. The purging actuator 16 comprises a cylinder 62 having ends defined by the center plate 34 and a bottom plate 64 connected by tie rods 66, and a piston 68 linearly movable within the cylinder 62. The piston 68 has an elongated, cylindrical body portion 70 that extends down through the bottom plate 64. The lower end of the piston 68 connects to a push ring 72 that drives the ram 60 through push rods 74 (see FIGS. 1 and 2). As with the piston 36 of the programming actuator 14, that the inner cylinder rod 22 passes through a central axial bore in the piston 68 and connects to the lower section 20 to form the full length parison rod 18.

As shown in the drawings, the lower portion of accumulator 10 includes an outer barrel 76 of cylindrical shape that is oriented (in operation) with its axis extending substantially vertically. The accumulator barrel 76 has an inner cylindrical surface that receives the ram 60 for vertical movement; FIG. 2b shows the ram 60 in its lowermost position (after the parison has been ejected). The lower end of barrel 76 includes a material outlet that terminates in the form of an annular die outlet 26 through which the tubular parison (not shown) is extruded. Die outlet 26 is defined by a die outer ring 28 that is secured by means of a clamping ring 78 to the lowermost end of accumulator barrel 76, and by an inner die pin 24 that has a generally cylindrical outer surface spaced from the inner surface of die ring 28 to define a die outlet 26 of substantially annular form. As described previously, the die pin 24 is part of the programming system (by its connection to the parison rod 18) that is used to control the size of the die opening 48.

When the extrusion blow molding machine is in operation, thermoplastic material is plasticized in the extruder and fed from the extruder into the accumulator 10. Since die pin 24 is initially in an upward, retracted position to close the parison die outlet 26, the plasticized material entering the accumulator head collects within an annular, internal chamber. The outer diameter of the accumulator chamber is defined by the inner diameter of lower end of the accumulator outer barrel 76, while the inner surface of the accumulator chamber follows the contour of the tooling adapter 80 and an inner sleeve 82. As the material continues to flow into this annular chamber, the ram 60 (along with piston 68 of the purging actuator 16) is gradually pushed upwardly by the continuously accumulating material. The upward movement of the ram 60 continues until it reaches a predetermined vertical position that corresponds to the desired volume of accumulated material.

When the desired volume of material has been transferred into the internal chamber near the end of accumulator outer barrel 76, programming actuator 14 is operated to move die pin 24 into position, thereby providing the desired size of the opening at parison die outlet 26 consistent with the wall thickness of the parison to be extruded.

Purging actuator 16 is then operated to drive the ram in a downward direction, ejecting the plasticized material from accumulator barrel 76 in the form of a tubular parison. If desired, the wall thickness of the parison can be varied as the parison is being ejected. For that purpose, a suitable variable programming system, the structure and operation of which is familiar to those skilled in the art, can be employed to control the vertical movement of the die pin 24 in conjunction with the ejection of the parison through the die outlet 26. More specifically, the speed at which material is ejected by the purging actuator 16 is synchronized with the size of the die opening as controlled by the programming actuator 14. The die pin 24 moves up or down as necessary to obtain a desired parison wall thickness distribution over the length of the parison, while the purging actuator 16 is operating to control the speed at which the parison is ejected.

When the parison has been fully ejected, the mold closes around it. The programming actuator 14 is activated to retract die pin 24, closing die outlet 26 so that the accumulator head 10 can begin building the next shot of material. With the stroke positioner 40 properly adjusted, the die outlet 26 is closed coincidentally with the piston 36 of the programming actuator 14 reaching the end of the stroke. This movement of the piston 36 and die pin 24 ensures that the die tooling will effectively close off the outlet in a controlled manner, without undue impact, thereby prolonging the life of the die tooling.

Just after the mold closes, blowing air is introduced into the parison via a passage 84 that extends from the top of the accumulator 10 down though the entire length of the parison rod 18 and through die pin 24 to an exit opening 86 near the lowermost end of the accumulator 10. The blowing air expands the parison to fill the mold cavity defined by the surrounding mold portions.

Although particular embodiments of the present invention have been illustrated and described, it will be apparent to those skilled in the art that various changes and modifications can be made without departing from the essence of the present invention. For example, it is contemplated that alternate means could be used to provide relative adjustment of the components, other that the threaded configurations described above. In addition, while shown in conjunction with a specific accumulator head construction, the concept of a stroke positioner can be used with other heads of differing construction, as are generally known in the art. It is, therefore, intended to encompass within the appended claims all such changes and modifications that fall within the scope of the present invention.

What is claimed is:

1. An accumulator head comprising:

a programming actuator having a piston linearly movable within a cylinder, the piston including an extended, cylindrical, outer adjustment rod, an annular outlet defined by die tooling, including a movable die pin, an inner adjustment rod having one end connected to the die pin and the opposite end received within and connected to the outer adjustment rod of the piston of the programming actuator, and stroke positioning means for connecting the inner adjustment rod to the piston in a manner that allows adjustment of the distance between the die pin and the piston, thereby positioning the die pin to close the annular outlet when the piston reaches a limit of its range of movement within the cylinder of the programming actuator, the stroke positioning means comprising a push-up nut adjustably attached to the end of the outer adjustment rod opposite the piston; a stationary collar attached to the end of the inner rod; and a pull-down nut attached to the push-up nut, such that movement of the push-up nut changes the position of the inner rod relative to the piston, and the stationary collar is trapped between the push-up nut and the pull-down nut when the accumulator is in operation.

2. The accumulator head of claim 1 wherein the adjacent ends of the inner and outer adjustment rods are threaded, such that the push-up nut is threaded onto the end of the outer adjustment rod opposite the piston; the stationary collar is threaded onto the end of the inner adjustment rod until it abuts a shoulder on the inner rod; a lock nut is threaded on the end of the inner adjustment rod until it tightly abuts the stationary collar; and the pull-down nut is threaded onto a threaded section of the outer diameter of the push-up nut.

* * * * *